POLYPHASE UNBALANCE DETECTION APPARATUS

Filed July 2, 1962

INVENTOR.
JACK C. FAGLIE
BY
Carlson & Carlson
ATTORNEYS

United States Patent Office 3,248,610

Patented Apr. 26, 1966

3,248,610

POLYPHASE UNBALANCE DETECTION APPARATUS

Jack C. Faglie, 2619 Friar Tuck Road, San Antonio, Tex.

Filed July 2, 1962, Ser. No. 206,973

13 Claims. (Cl. 317—27)

This invention relates generally to the field of protective equipment for use in combination with polyphase electrical energy distribution systems and devices utilized in conjunction therewith and is more particularly directed to apparatus for providing detection and indication of the presence of unbalanced amounts of energy between one or more phases of such a distribution system.

The increased utilization of electrical machinery in present day manufacturing facilities and the like, has lead to the development of the polyphase system of power distribution so as to provide increased efficiency from smaller electrical equipment and to reduce the total amount of wire required for power distribution along with attendant decreases in capital investment so as to provide facilities which are operable with increased efficiency.

In the utilization of polyphase power distribution and power utilization devices, it has been discovered that an unbalance between the various phases of electrical energy utilized in a given system may result in severe and expensive damage to power utilization devices and equipment. One such phenomena is known as single phasing and upon this and other types of faults occurring, it is desirable to immediately disconnect the power utilization devices or equipment from the source of electrical power. Sensitivity and speed of response are of utmost importance. Of course, any such device for detecting or indicating these malfunctions must be capable of being sold at a price that is economically consistent with the equipment to be protected.

One example of the prior art with which the present invention is concerned may be seen in my co-pending application entitled, "Polyphase Electro-Responsive Apparatus," Serial No. 807,539, filed April 20, 1959, now Patent No. 3,184,644.

Accordingly, the present invention provides apparatus for detecting or indicating an unbalance between phases in a polyphase system which is operative with a sensitivity and speed to provide improved performance over known prior art devices while being comprised of a combination of devices which result in a lower overall cost of acquisition to the user.

In my invention a unidirectional current having components from each of the phases is derived from a polyphase distribution system. A current responsive detection means, having a potential responsive variable impedance means connected in parallel therewith, is connected in series with a further impedance, having a capacity means connected in parallel therewith, across a source of unidirectional current. The potential responsive variable impedance means is comprised of a device which has the characteristic of inversely varying in impedance in response to changes in magnitude of the potential applied thereto.

Further objects, features and advantages of the invention will emerge from a consideration of the presently preferred embodiments of the invention, wherein I have set forth the best mode now known to me of carrying out the same, taken in conjunction with the accompanying drawings, in which like numerals refer to like parts and in which.

Figures 1, 2, 3:
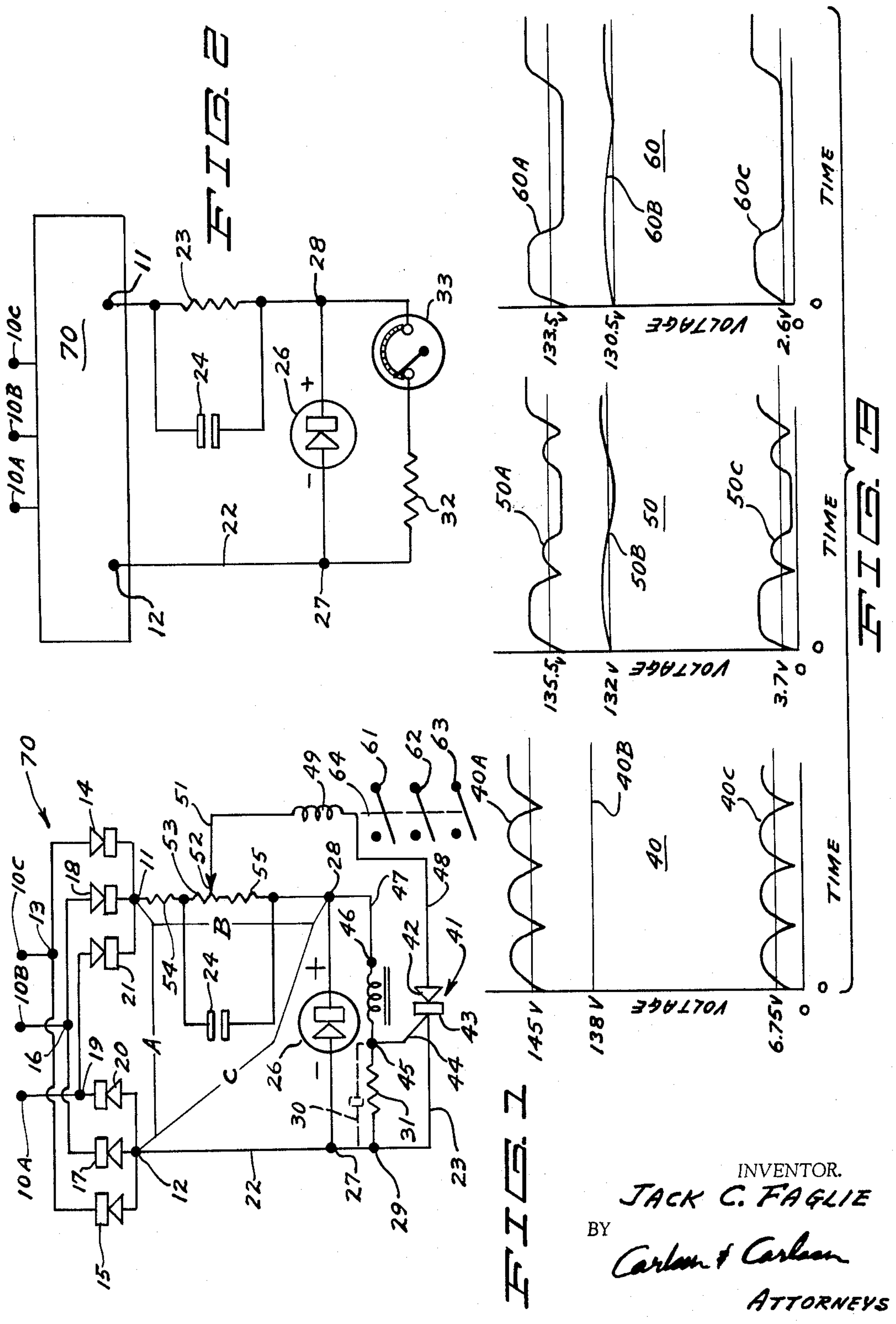
FIG. 1 is an electrical schematic drawing of apparatus for automatically disconnecting and reconnecting power utilization devices in response to detected unbalance between phases in a polyphase distribution system.
FIG. 2 is an electrical schematic drawing of apparatus embodying the principles of my invention for providing a visual indication of unbalance between phases in a polyphase system.
FIG. 3 is a family of curves illustrating the wave forms occurring under certain conditions and appearing across several portions in the apparatus of FIG. 1.

Referring nw to FIG. 1, there is shown a plurality of terminals, 10A, 10B and 10C, adapted for connection to a polyphase distribution system (not shown), which for example may be a three-phase delta connected system. Each of the terminals has a further terminal, 19, 16 and 13, connected thereto. A plurality of asymmetrical current devices, poled in the directions shown are connected intermediate respective terminals of each of the last named terminals and a pair of output terminals 11 and 12 so as to provide a full-wave rectification of each of the currents appearing at terminals 10A, 10B and 10C. The assemblage of asymmetrical current conducting devices as indicated generally by the reference character 70 which may consist of individual rectifying devices 14, 15, 17, 18, 20 and 21. In a circuit which may be followed from terminal 11 to terminal 12, there is shown a resistor 55, a potentiometer winding 53, having a wiper 52 associated therewith, resistor 55, terminals 28, asymmetrical current conducting device 26, terminal 27, and conductor 22 connected to terminal 12. A capacitor 24 is connected in parallel with potentiometer winding 53 and resistor 55. An inductive impedance 46 and resistive impedance 31 are connected in parallel with asymmetrical current conducting device 26 through conductor 47, inductor 46, terminal 45 and resistor 31 connected to terminal 29. A capacitor 30 is shown in dotted outline connected in parallel with resistor 31. A relay winding 49 and the anode and cathode of a silicon controlled rectifier 41 are connected intermediate wiper 52 on potentiometer 53 and terminal 29 through conductor 51, relay winding 49, conductor 48, anode 42, cathode 43 and conductor 23. A trigger electrode 44 is connected to terminal 45 intermediate resistive impedance 31 and inductive impedance 46. Relay winding 49 is operatively connected to a plurality of contact assemblies 61, 62 and 63 through driving means 64. It is anticipated that the stationary and movable contacts of the contact assemblies may be connected, in a manner not shown, to connect and disconnect a power utilization device to the polyphase distribution line.

It may be noted that terminals 10A, 10B and 10C may also be connected to the distribution system through suitable transformer means so as to provide a suitable voltage input to the apparatus where necessary. Of course, the values of the individual components and devices may be modified so as to provide for direct connection to any polyphase distribution system. Capacitor 30 is connected in parallel across resistive impedance 31 to provide a time delay in the operation of the apparatus where this feature is necessary under certain operating conditions and may be utilized as the need for same becomes apparent to one skilled in the art. The light bracketing lines indicated by the reference characters A, B and C correspond to the curves of FIG. 3 such that curves 40A, 50A and 60A represent the potential appearing across terminals 11 and 12, curves 40B and 50B and 60B represent the potential appearing across terminals 11 and 28 and curves 40C, 50C and 60C represent the potential appearing across terminals 12 and 28.

OPERATION OF FIG. 1

In operation, the terminals 10A, 10B and 10C are connected to a polyphase distribution system and contact assemblies 61, 62 and 63 are connected so as to control the energization of a power utilization or load device that is to be protected. When a balance in the energies appearing in the different phases of the polyphase system exist, the unidirectional current flowing between terminals 11 and 12 is as indicated in the curve family indicated by the reference character 40 in FIG. 3. It should be noted that the current consists of A.C. and D.C. components and that the A.C. component tends to follow a path from terminal 11 through resistive impedance 54, capacitive impedance 24, terminal 28, asymmetrical current conducting device 26, terminal 27 and conductor 22 to terminal 12. The D.C. component of the unidirectional current tends to follow a path from terminal 11 through resistive impedance 54, resistive potentiometer impedance 53, resistive impedance 55, terminal 28, conductor 47, inductive impedance 46, terminal 45, resistive impedance 31, terminal 29, terminal 27 and conductor 22 connected to terminal 12. It may also be noted that asymmetrical current conducting device is poled in a direction opposite to that of normal easy conduction. Asymmetrical current conducting device 26 may preferably be a device known as a Zener diode which has the characteristic of conducting current in a reverse direction when the Zener or avalanche voltage, as applied in the reverse direction, is reached. The voltage thereacross remains substantially constant regardless of such reverse current flow up to the capacity of the device. It is also noted that the impedance or resistance, of the device varies inversely with the magnitude of the reversely polarized current flowing therethrough.

*Operation*

Energization from a balanced polyphase distribution system is shown by curve family 40 in FIG. 3. Under this condition, the D.C. potential appearing at terminal 45 is sufficient to trigger the silicon controlled rectifier 41 into conduction which in turn energizes relay winding 49 and serves to connect the load to the distribution system. For the values of the components indicated below, a uniform balanced increase or decrease of approximately 20% in the individual phase voltages or energies does not result in de-energization of relay winding 49 to disconnect the load as such a phenomena is tolerable by the equipment connected to the polyphase distribution system. Under these conditions, a uniform increase or decrease results in a substantially constant voltage appearing across terminals 27 and 28 due to a substantially constant impedance presented by potential responsive variable impedance means 26. Under such conditions, the silicon controlled rectifier 41 remains conductive and relay winding 49 is continually energized. In the families of curves 50 and 60 in FIG. 3, a 5% phase voltage unbalance and the condition wherein one phase conductor is open are shown respectively. Under such conditions, it may be noted that the alternating current component of the unidirectional current increases proportionally to any unbalance between the phases in the polyphase distribution system. Substantially all of the alternating current component appears across Zener diode 26 which is responsive to the increase to present a lower impedance to the direct current component and thus functions as a shunt to tend to decrease, or divert, the flow of direct current though inductive means 46 and impedance means 31. Under such conditions, the potential appearing at terminal 45 is reduced to a point below that which is necessary to sustain conduction of silicon controlled rectifier 41. When silicon controlled rectifier 41 becomes non-conductive, relay winding 49 is de-energized and contact assemblies 61, 62 and 63 are opened to disconnect the load from the polyphase distribution system.

As noted above, impedance means 46 serves to maintain a substantially high degree of separation between the current paths followed by the alternating and direct current components of the energy applied to the apparatus. While the preferred embodiment shows impedance means 46 as an inductor, it has been observed that satisfactory operation may be obtained with other forms of conductive impedance means. Under some circumstances it is possible to eliminate this device altogether and obtain satisfactory operation of the apparatus. Under such conditions of operation with the apparatus described above, the sensitivity of the apparatus to variations in the characteristics of the parameters of the source of power to which the apparatus is connected will be decreased because the separation of the alternating and direct components of current is decreased. The characteristics of the silicon controlled rectifier 41 are such that the potential applied across its anode and cathode 42 and 43 determines to some extent its conduction and non-conduction and the range, or band, between such voltages. Suitable adjustment of this potential may be obtained by moving wiper 52 on potentiometer 53 to select the desired potential as determined by the requirements of the particular application.

The following is a table of values utilized in the embodiment illustrated in FIG. 1 in which satisfactory operation was obtained in disconnecting a motor load from the polyphase distribution system at a 5% voltage unbalance as determined by NEMA standards and which automatically reconnected the motor to the line at less than 2½% voltage unbalance as determined by NEMA standards:

| | |
|---|---|
| Resistor **54**, ohms | 22 |
| Resistor **55**, ohms | 5,000 |
| Potentiometer **53**, ohms | 5,000 |
| Resistor **31**, ohms | 1,000 |
| Inductor **46**, henries 900 ohms D.C. | 20 |
| Capacitor **24**, microfarads | 4 |
| Silicon controlled rectifier **41** | (1) |
| Relay winding **49**, ohms D.C. | 6,000 |
| Zener diode **26**, volts | 12 |

[1] Type 2N 1602, Texas Instruments Inc.

The apparatus was connected to a 230 volt three-phase distribution system through a transformer which provided 80 volts across each secondary winding. The transformer was connected in a delta to delta configuration.

It may be appreciated that while the preferred embodiment illustrates a silicon controlled rectifier for controlling the operation of relay winding 49, inductor 46 and resistive impedance 31 may be replaced with a relay winding which will be operable in the same manner as noted above for the silicon controlled rectifier-relay winding to connect and disconnect the load in accordance with those conditions appearing across the polyphase distribution system.

In FIG. 2, a current responsive indicating means 33 and resistive impedance 32 are connected across terminals 27 and 28. The means for providing the unidirectional potential proportional to the polyphase distribution system is shown in block form and is indicated by the reference character 70 and may be any suitable means for deriving the unidirectional current from a polyphase system. Indicating means 33 will indicate directly, by position of the needle in response to the current flow therethrough, the conditions in the polyphase distribution system. It may be suitably calibrated in percent of unbalance so as to indicate to an operator the conditions appearing in the distribution system and he may then take any necessary corrective action, by way of disconnecting loads and the like.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus of the class above described, the combination, comprising:

means connected to a source of polyphase electrical energy for supplying a unidirectional signal proportional to said source, said means having a pair of output terminals, and said signal including alternating and direct electrical energy components;

first impedance means and current responsive means connected intermediate said output terminals;

second impedance means having a low impedance to said alternating component connected in parallel with said first impedance means;

and variable impedance means connected in parallel with said current responsive means, said variable impedance means being responsive to said alternating component.

2. The apparatus of claim 1 in which the current responsive means is a meter.

3. The apparatus of claim 1 in which the current responsive means is a coil winding.

4. The apparatus of claim 1 in which the current responsive means has a high impedance to the alternating component of the unidirectional signal.

5. The apparatus of claim 1 in which the variable impedance means is an asymmetrical current conducting device having inverse current-potential conducting characteristics.

6. The apparatus of claim 1 in which the variable impedance is responsive to the alternating component of the signal to vary its impedance to the direct component inversely to the relative magnitude of the alternating component.

7. A polyphase potential unbalance detector comprising in combination:

rectifying means having input terminals for connection to a source of polyphase electric energy and a pair of output terminals;

impedance means and current responsive means connected intermediate said output terminals;

potential responsive variable impedance means connected in parallel with said current responsive means; and capacitive impedance by-pass means connected in parallel with said impedance means.

8. The apparatus of claim 7 in which a current controlling device having input and output terminals is connected in circuit with a load means and the current responsive means whereby one of said terminals is common, one of said input terminals is connected to said current responsive means and one of said output terminals is connected to said first impedance means and said load means.

9. The apparatus of claim 8 in which said load means is operative to control the energization of a power utilization device.

10. Apparatus for detecting unbalance between phases in a polyphase system comprising:

means for deriving a unidirectional signal from all phases of a polyphase source of electrical energy, said signal including alternating and direct components;

first impedance means having a capacitance connected in parallel therewith, said capacitance being of low impedance to the alternating component of said signal;

second impedance means of lower impedance to said direct current component and of higher impedance to said alternating component;

means connecting said first and second impedance means in series to said first named means;

potential responsive impedance means, responsive to said alternating component to vary the impedance thereof to said direct component, connected in parallel with said second impedance means; and load means connected to said second impedance and responsive to the flow of energy therethrough for controlling a power utilization device.

11. In apparatus of claim 10 in which the potential responsive means is a Zener diode having inverse resistance characteristics with respect to the magnitude of a potential reversely applied thereto.

12. The apparatus of claim 10 in which the load means includes a silicon controlled rectifier.

13. The apparatus of claim 10 in which the second impedance means is a current indicator.

References Cited by the Examiner

UNITED STATES PATENTS

| | | | |
|---|---|---|---|
| 2,994,039 | 7/1961 | Parke | 324—110 |
| 3,018,356 | 1/1962 | Busch et al. | 317—33 X |

SAMUEL BERNSTEIN, *Primary Examiner.*

L. McCOLLUM, *Examiner.*

J. D. TRAMMELL, *Assistant Examiner.*